Patented Oct. 4, 1927.

1,643,962

UNITED STATES PATENT OFFICE.

HUGH McCURDY SPENCER, OF NEWARK, NEW JERSEY, ASSIGNOR TO SEYDEL CHEMICAL COMPANY, A CORPORATION OF WEST VIRGINIA.

ALUMINA COAGULANT.

No Drawing. Application filed April 16, 1924. Serial No. 706,882.

This invention relates to the purification of liquids and solutions and particularly to the purification of water for industrial and municipal use and has for one of its principal objects the more efficient and convenient removal of suspended or colloidal matter from such liquids by means of an improved alumina-containing coagulant or precipitating agent. Another object is to facilitate the efficient filtration, centrifugation, etc., of finely suspended or colloidal solids or liquids in a liquid medium.

Hitherto in the purification of water by means involving the use of aluminum compounds; the usual practice has been to add the aluminum compound to the raw or treated water in the form of commercial aluminum sulfate or frequently as ordinary alum. If the water is very alkaline copperas is also sometimes added, for the reason that the gelatinous precipitate of ferric hydroxide resulting from the action of the copperas on the water is less soluble in alkaline waters than is aluminum hydroxide, the ferric hydroxide taking the place of the portion of alumina redissolved by the excess alkali. After sufficient time has been allowed for the reaction between the aluminum compound and the alkalis of the water to take place, to produce a precipitate of hydrated alumina, the water is ordinarily filtered (by methods already well-known in the art) whereby the precipitated alumina, along with the suspended and colloidal matter originally present in the water is removed, producing a clarified water. If desired, the clarified water from the filtering operation may then be subjected to any further suitable treatment, as with water softening agents or sterilizing agents, septic tank treatment, or other suitable agencies to complete the purification all according to well known procedures.

The reaction between the aluminum salt and the bases in the water ordinarily requires a considerable length of time and for this reason storage tanks of very large capacity are usually employed to permit storage of the water while the reaction is taking place and before passing the water to the filters.

If the raw water is acid it must be rendered alkaline before adding the sulfate of alumina, otherwise the hydrated alumina will not be precipitated at all, or at least ordinarily it will not be precipitated in sufficient amounts to aid in the filtering operation to bring about an effective precipitation of suspended and colloidal impurities. The basic compounds ordinarily employed for neutralizing the acid of the raw waters to render them alkaline are lime, caustic soda or soda ash.

In the purification of industrial waste waters such as the waste liquors from tanneries, wood pulp waste-liquors, etc., lime containing compounds are frequently used in connection with the various other treatments all directed to the purification of these waste waters to a sufficient extent to promote their introduction into streams and rivers without polluting the same.

In all of these instances where an aluminum compound is employed as a coagulating or precipitating reagent, either alone or in connection with other reagents such as lime, copperas, etc., the reaction of the water before the addition of the aluminum compound must be carefully adjusted. That is to say, the raw water before treatment with the aluminum compound must either be alkaline to begin with or must be rendered so by the addition of suitable reagents as previously mentioned. On the other hand, a raw water which is originally too alkaline, or which has been rendered so by treatment, will retard the precipitation of the hydrated alumina and thus render the precipitating action of the aluminum salt less effective to a greater or less degree. This necessary preliminary treatment or control of the alkalinity of the raw water constitutes one of the most troublesome of the many serious difficulties encountered in the application of alumina coagulants in the purification of water according to the methods hitherto in use and one of the principal objects of the present invention is to provide an alumina-containing coagulant which shall be effective in many instances where such preliminary treatment has hitherto been necessary in removing suspended and colloidal impurities from the water without the necessity of subjecting the raw water to a preliminary treatment to control and regulate the alkaline reaction prior to the addition of the alumina-coagulant.

Also, as already mentioned, among the other serious difficulties hitherto met with in the application of alumina-coagulants has been the necessity for the prolonged storage of the water during the time required for the coagulating action of the aluminum compound to complete itself. The large storage and settling basins required for this purpose add materially to the cost and inconvenience of treating waters by this method, and the overcoming or lessening of this difficulty constitutes a second very important object of my invention.

These and other desirable objectives are accomplished in accordance with the present invention in an economical and convenient manner, by providing an alumina-containing coagulant of such character than when added in relatively small amounts to a relatively large volume of water, hydrated alumina is at once precipitated in a form which carries down the impurities with it and also which can be readily removed by the usual method of filtration and, furthermore, this highly advantageous result is attained with a great variety of raw waters, industrial waste liquors, and other liquids of widely varying nature and characteristics without preliminary treatment.

More specifically, these advantageous results are accomplished by providing, in the preferred form of the invention, a concentrated alumina-containing coagulant which is very nearly neutral or slightly acid in reaction, and in which the hydrated alumina is present, not in a precipitated or gelatinous form as would naturally be expected with neutralized or partially neutralized aluminum salts under ordinary circumstances, but in which it is present in a dissolved or partially dissolved state or colloidal condition from which state it does not separate to any objectionable extent even when allowed to stand for considerable periods of time. When, however, this improved coagulant is diluted to any considerable extent, as for example when it is added to the water to be purified, the alumina content, as mentioned, readily passes into the form of a gelatinous coaglum or precipitate carrying the suspended and colloidal impurities, bacteria, etc., along with it.

This action is the more remarkable since, as is well known, when a solution containing an aluminum salt is gradually neutralized by caustic soda, for example to reduce the acidity of the solution, a portion of the alumina in the solution will first separate (as the neutralizing agent is added) in the form of a gelatinous precipitate or coagulum, and then completely redissolve as excess is added. In other words when this ordinary method of neutralizing or precipitating alumina-containing solutions is employed (as one would normally be led to practice) it is not possible or practicable to obtain a partially or nearly neutralized or slightly acid alumina-containing solution without, at the same time, obtaining a precipitate of a considerable portion of the alumina content. But by employing the process and means of the present invention, such a partially or nearly neutralized or slightly acid concentrated solution of an aluminum compound can be obtained without obtaining any objectionable precipitate or coagulate of the alumina. That is to say, as a certain neutral point or isoelectric point is approached or almost reached, the solution remains or becomes mechanically homogeneous in character (that is, there is no objectionable precipitation) and shows usually only a slight turbidity or milkiness due to the formation of hydrated alumina in a highly disseminated or colloidal condition in the liquid.

The reagent employed to produce this result in accordance with the present invention, may be a basic salt of a strong base and a weak acid, such for example as sodium carbonate or bi-carbonate or similar alkali metal carbonate or carbonate of ammonium, normal sodium sulphite, di-sodium hydrogen phosphate, etc. By basic salt, in this connection I mean a salt which has a sufficiently strong basic strength to reduce the acidity of a solution of an aluminum salt to the degree specified. In other words I believe that the acid of the basic salt must be replaceable to a substantial extent by the acid of the aluminum salt, and that this acid must be capable of peptizing the hydrated alumina but not strong enough to completely dissolve or chemically combine with the alumina to form a stable compound therewith in solution or cause it to precipitate. The improved coagulant of the invention may also be prepared by treatment of aluminum hydroxide with such weak acids, for example, carbonic acid or sulfurous acid, or by the anhydride of such weak acids. Other peptizing agents which may be employed include sucrose, glucose, glycerol, ethyl alcohol and methyl alcohol.

It will also be seen that the present invention in one of its aspects provides for the purification of water through the agency of an aluminum salt and a basic compound, not by adding the basic compound to the water prior to the treatment of the water with the aluminum compound as in the usual methods, but, on the contrary, by providing for the addition of the basic compound to a concentrated solution containing the aluminum salt and then the addition of this mixture to the water or solution to be purified.

One of the important and unexpected advantages obtained by this procedure, as already mentioned, is the shortening of the time required for the formation of the gelatinous precipitate or coagulum of hydrated alumina. Another advantage is the elimination, in many instances, of the necessity of subjecting acid waters to a neutralizing treatment before adding the alumina-coagulant. The precipitation referred to occurs even when the water to be treated contains relatively large amounts of free acid, sometimes as such as an amount chemically equivalent to the alumina-content of the coagulant although in this case precipitation might be somewhat retarded, whereas if the equivalent amount of base were first added to the water to neutralize the acid content thereof, in accordance with the older practice, the precipitation of hydrated alumina would frequently either not take place at all or else would be retarded to such an extent that long periods of time would be required to bring about the desired precipitation, with the accompanying disadvantages as to the storage tanks and time of treatment referred to above.

While I do not wish to restrict the scope of my invention by any unwarranted assumption or explanations as to the exact chemical reactions or other changes which take place either during the preparation of my improved coagulant or during the action of the latter upon the water, nevertheless, I believe that the formation of the improved coagulant in accordance with the method of the present invention is due in part at least to a peptization or partial solubilization of the hydrated alumina precipitate or coagulum by the carbonic acid or other similar weak acid which is formed when the solution containing the aluminum salt is neutralized by sodium carbonate or like salt of a strong base and a weak acid. Also this is the explanation, I believe, of the fact for example that I may prepare my improved coagulant in one of its forms by first partially precipitating hydrated alumina from a solution of an aluminum salt by means of caustic soda and then passing carbon dioxide through the mixture thus obtained, or otherwise adding a suitable weakly acidic substance until the coagulated or precipitated hydrate of alumina is peptized or partially solubilized to produce a liquid containing the hydrated alumina in colloidal or partially solubilized condition such that when diluted it readily decomposes to again reproduce the precipitate or coagulum of hydrated alumina.

The formation of a satisfactory precipitate of hydrated alumina in accordance with the method of the present invention, even in the presence of free acid, is due also, I believe, in part at least to the dilution of the weak acid or other peptizing agent which is present in the coagulant in relatively high concentrations, in part to the slowness with which the precipitated or coagulated hydrated alumina reacts with the dilute solution of acid already present in the water, and in part, perhaps, to the relatively large change in the hydrogen ion concentration of the coagulant upon dilution. Another feature of the present invention which contributes to this same result is the greater ease with which the improved alumina-containing coagulant is hydrolyzed when diluted. The improved coagulant is adjusted with respect to its hydrolyzable properties in such a way that it is readily decomposed upon dilution to form a gelatinous precipitate of aluminum hydroxide, whereas the salts, solutions and compounds hitherto used for this purpose, being more stable in their reaction toward water, are more difficult to hydrolyze or decompose in this manner.

Having described the main general features and characteristics of my invention, I wish now to give a few specific examples of my improved coagulant and methods of making and using the same. It is to be understood, however, that my invention is not restricted to the details given in these examples but that they are given merely by way of illustrating a few embodiments of my invention:

Example 1. Run 240 pounds of water into a steam jacketed kettle that is lined with enamel or stoneware or any other substance that is not attacked by sulphate of alumina. Bring the water to a boil and add to it 286 pounds of commercial sulphate of alumina that is either iron free or not, as the case may be. The iron free is preferred for drinking water clarification. Stir until the sulphate of alumina has completely dissolved. Allow this solution to cool to room temperature, or else cool it artificially by pipe coils or by admitting cold water into the jacket. Add, little by little and with constant stirring, 72 pounds of finely powdered commercial soda-ash. The soda-ash should not be added too quickly since this will cause too rapid frothing due to the decomposition of the soda-ash by the sulphate of alumina and the solution is apt to foam over. Allow the solution to stand over night, after which it is ready for use.

The above formula may be varied by using the proportions of 800 parts water, 800 parts commercial sulphate of alumina, and 200 parts soda-ash. Also the soda-ash may be dissolved in water and the sulphate of alumina added in the proportions given in Example 1. However, this last method is troublesome because aluminum hydrate will not redisperse until practically all the soda has been neutralized and the solution has become acid. Hence the rule to follow is to add the soda to the sulphate of aluminum and not vice versa. In conclusion it must be remembered that the amount of soda can be in any degree less than that given in Example 1, but it should not be much more than the amount indicated because if the solution crosses the iso-electric point precipitation of aluminum hydrate occurs which is not readily redispersable unless the solution is again rendered acid by the addition of more sulphate of alumina or some acid.

Example 2. Follow the procedure substantially as described in Example 1 substituting a sufficient amount of normal sodium sulphite ($Na_2SO_3$) for the sodium carbonate used in Example 1 to peptize or partially redissolve the precipitate of hydrated alumina first formed to bring the alumina into substantially the same dispersed state or colloidal condition as in the end product of Example 1.

Example 3. Follow the procedure substantially as described in Example 1, substituting a sufficient amount of di-sodium hydrogen phosphate ($Na_2HPO_4.12H_2O$) for the sodium carbonate used in Example 1 to peptize or partially redissolve the precipitate of hydrated alumina first formed to bring the alumina into substantially the same dispersed state or colloidal condition as in the end product of Example 1.

Example 4. To a solution consisting of 600 pounds of water and 400 pounds of commercial sulphate of alumina, add, with stirring, 120 pounds of calcium carbonate. Filter or decant the liquid from any sediment. The clear solution is then ready for use. The stability of the resulting coagulant solution may be improved by the addition of from 5 to 10 pounds of either $NaHSO_3$, $Na_2SO_3$, $Na_2HPO_4$ or $NaH_2PO_4$ to the aluminum sulphate solution before the addition of the calcium carbonate.

Example 5. Semi-solid, moist aluminum hydroxide or aluminum hydrate suspended in water is subjected to the action of a current of sulphur dioxide gas up to the limit of solubility of sulphur dioxide in the water present or in any lesser amount that is found adequate to peptize or to put into a quasi solution (colloidal solution) the aluminum hydroxide. To promote the readiness of precipitation upon dilution, the acidity of the solution may be partially neutralized by the addition of sodium carbonate. Any excess sulphur dioxide gas may be recovered and returned to the peptizing system containing the mixture or suspension of aluminum hydroxide which is being peptized by any suitable means.

Example 6. Dissolve 200 pounds of $Al_2(SO_4)_3.18H_2O$ in 170 pounds of water, and add little by little and with constant agitation 38 pounds of sodium hydroxide while passing a stream of carbon dioxide gas up to the limit of solubility in the solution or in any lesser amount that is found adequate to peptize or put into a quasi solution (colloidal solution) the aluminum hydroxide, through the solution. Any excess carbon dioxide gas may be recovered and returned to the peptizing system by any convenient means.

Example 7. Semi-solid, moist aluminum hydroxide or aluminum hydrate suspended in water is subjected to a current of mixed gases consisting of carbon dioxide and sulphur dioxide up to the limit of solubility of the mixture in the water present or in any lesser amount that is found adequate to peptize or to be put into a quasi solution (colloidal solution) the semi-solid aluminum hydroxide or the suspension of the aluminum hydroxide. Any excess of carbon dioxide or sulphur dioxide or both may be recovered and returned to the peptizing system containing the mixture or suspension of semi-solid aluminum hydroxide which is being peptized by any convenient means.

Example 8. The peptization of the alumina or suspension of aluminum hydrate in water may be effected completely or in part as described in Examples 4 or 6 and afterwards the peptization may be completed with sulphur dioxide gas, or an excess of sulphur dioxide may be employed up to saturation of the water present to act as a stabilizer for the peptized aluminum hydroxide.

In Examples 4 to 8 inclusive the carbon dioxide or sulphur dioxide gas or both may be retained in the peptizing system under pressure, and also the peptization may be carried out at temperatures either higher or lower than ordinary temperature, the peptizing action being usually more rapid at higher temperatures that at lower temperatures.

Furthermore, in Examples 5 and 7 in place of the semi-solid, moist aluminum hydroxide, I may substitute the mineral bauxite as such, preferably in finely comminuted state. In this manner I may avoid the necessity of preparing the aluminum hydroxide from a solution of aluminum salt, as for example by precipitation in the usual manner. And in general it will be understood that my invention is not restricted to any particular method of preparing the semi-solid, moist aluminum hydroxide of the preceding examples, but I may prepare this material by any other suitable method as for example by precipitating it from a solution of aluminum sulphate or alum by means of the requisite quantity of sodium carbonate or other suitable base under appropriate conditions or I may prepare the semi-solid, moist aluminum hydroxide by precipitating it from so-called "sodium aluminate" by means of any suitable acid under proper conditions all in accordance with methods and procedures which are well-known.

In Examples 5 and 7 the semi-solid, moist aluminum hydrate may be in the form of a jelly consisting of approximately 50% aluminum hydrate ($Al(OH)_3$) and 50% water. Furthermore, in each of these examples vigorous stirring of the mixture may be employed during the gasifying process in order to promote the peptization.

It will be understood further that in the peptization of semi-solid, moist aluminum hydrate or its equivalent, the peptization proceeds even in the presence of impurities such as are formed during the process of preparing the semi-solid hydrate. Thus, for example, the peptization will take place in the presence of sodium sulphate formed when aluminum hydrate is precipitated from aluminum sulphate with caustic or carbonate of soda. Certain impurities, however, such as sodium sulphate, do have an effect, I have found, upon the stability of the peptized alumina or colloidal solution of aluminum hydroxide prepared in accordance with my invention. When, therefore, it is desirable to produce a stable form of my product I may separate such interfering impurities before or after peptizing the semi-solid hydrate of alumina. Solid impurities, such as calcium sulphate, can be removed by filtration or decantation. Sodium sulphate may be removed by chilling.

Example 9. Dissolve 200 pounds of

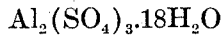

in 170 pounds of water and thoroughly stir into the solution about 1%, more or less, of sucrose, glucose or glycerol. To this solution add gradually and with constant stirring 38 pounds of sodium hydroxide. The peptizing reaction may be promoted, within limits, by warming the mixture during or just after the addition of the sodium hydroxide. Overheating, however, must be avoided. Semi-solid moist aluminum hydroxide or aluminum hydrate, freshly precipitated in a separate operation, may be peptized in a similar manner immediately after precipitation. In the latter case, it is advantageous to use, in conjunction with the organic peptizing agent, some weakly acidic agent.

The above formula may be varied by using an equivalent amount of ethyl alcohol or methyl alcohol in place of sucrose, glucose or glycerol or mixtures of any or all of these reagents may be employed. Weakly acidic substances such as carbon dioxide, sulphur dioxide or sulphuric acid derivatives may also be employed in conjunction with the peptizing agents described in Example 9. Furthermore, in Example 9, I may acidify or make alkaline the solution or suspension during peptization by the addition of small amounts of mineral acids such as sulphuric acid, hydrochloric acid or nitric acid or by organic acids such as acetic or oxalic acid, or by alkaline substances such as sodium hydroxide, potassium hydroxide, ammonium hydroxide or tri-methyl-amine.

Example 10. To a solution composed of 60 parts by weight of water and 40 parts by weight of crystallized aluminum sulphate is added about 1% by weight of sucrose, glucose or glycerol or an equivalent amount of ethyl alcohol or methyl alcohol or a mixture of any or all of these peptizing agents. To this solution is added in small quantities at a time an alkali or an alkaline salt such as sodium hydroxide, sodium carbonate, sodium sulphide, sodium oxide, lithium hydroxide, potassium hydroxide, or potassium carbonate or other substances which tends to neutralize the aluminum sulphate and to produce aluminum hydroxide, such as sodium phosphate, either the tri-sodium or the di-sodium phosphate, or sodium sulphite, until the alumina is brought into substantially the same dispersed state or colloidal condition as in the end product of Example 1.

In applying my improved coagulant prepared in accordance with the foregoing examples to the clarification of industrial waste liquors, the amount which should be used varies considerably according to the character of the liquor being treated and the amount of solid matter already present, but I have obtained good results in the clarification of certain waste-liquors by adding the peptized alumina prepared as described in Examples 1 to 3 in amounts corresponding to one-half of one percent to one percent by weight of the water or waste-liquors treated.

I claim:

1. An improved alumina-containing coagulant for clarifying aqueous liquids comprising a concentrated solution containing alumina and a solution of sulphur dioxide in an amount sufficient to peptize the alumina.

2. An improved alumina-containing coagulant for clarifying aqueous liquids comprising a concentrated solution containing alumina and sulphurous acid in an amount sufficient to peptize the alumina.

3. An improved alumina-containing coagulant for clarifying aqueous liquids comprising a concentrated solution containing alumina and peptizing agents in amount sufficient to peptize the alumina, the peptizing agent including a soluble acid-forming gaseous oxide and an organic peptizing agent.

4. The method of preparing an alumina-containing coagulant for purifying aqueous liquids which comprises subjecting a hydrate of alumina to the peptizing action of sulphurous acid in the presence of water.

5. The method of preparing an alumina-containing coagulant for clarifying aqueous solutions which comprises subjecting a hydrate of alumina to the peptizing action of an organic peptizing agent and a soluble acid-forming gaseous oxide in the presence of water.

6. The method of purifying aqueous liquids to remove suspended impurities therefrom which comprises subjecting the liquid to the action of a concentrated solution containing a hydrate of alumina which has been peptized by means of a sulphurous acid.

7. The method of purifying aqueous liquids to remove suspended impurities therefrom which comprises subjecting the liquid to the action of a concentrated solution containing a hydrate of alumina which has been peptized by means of an organic peptizing agent and a soluble acid-forming gaseous oxide.

8. The method of purifying aqueous liquids to remove suspended impurities therefrom by means of alumina which comprises peptizing the alumina by means of a sulphurous acid in the presence of water and subsequently subjecting the aqueous liquid to the action of the concentrated peptized alumina solution.

9. The method of purifying aqueous liquids to remove suspended impurities therefrom by means of an organic peptizing agent and a soluble acid forming gaseous oxide in the presence of water and subsequently subjecting the aqueous liquid to the action of the concentrated peptized alumina solution.

In testimony whereof I affix my signature.

HUGH McCURDY SPENCER.